Jan. 26, 1932.  B. G. GOBLE  1,842,521

TWO-PIECE CHAIN WITH OIL BATH

Filed May 28, 1929   2 Sheets-Sheet 1

*Inventor*

BERT G. GOBLE.

*By* Tom G. Boman.   *Attorney*

Jan. 26, 1932. B. G. GOBLE 1,842,521
TWO-PIECE CHAIN WITH OIL BATH
Filed May 28, 1929 2 Sheets-Sheet 2
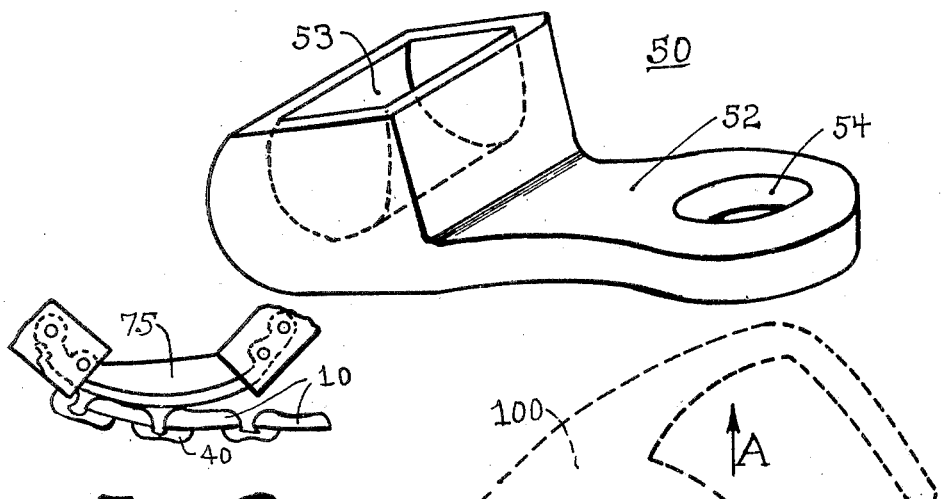
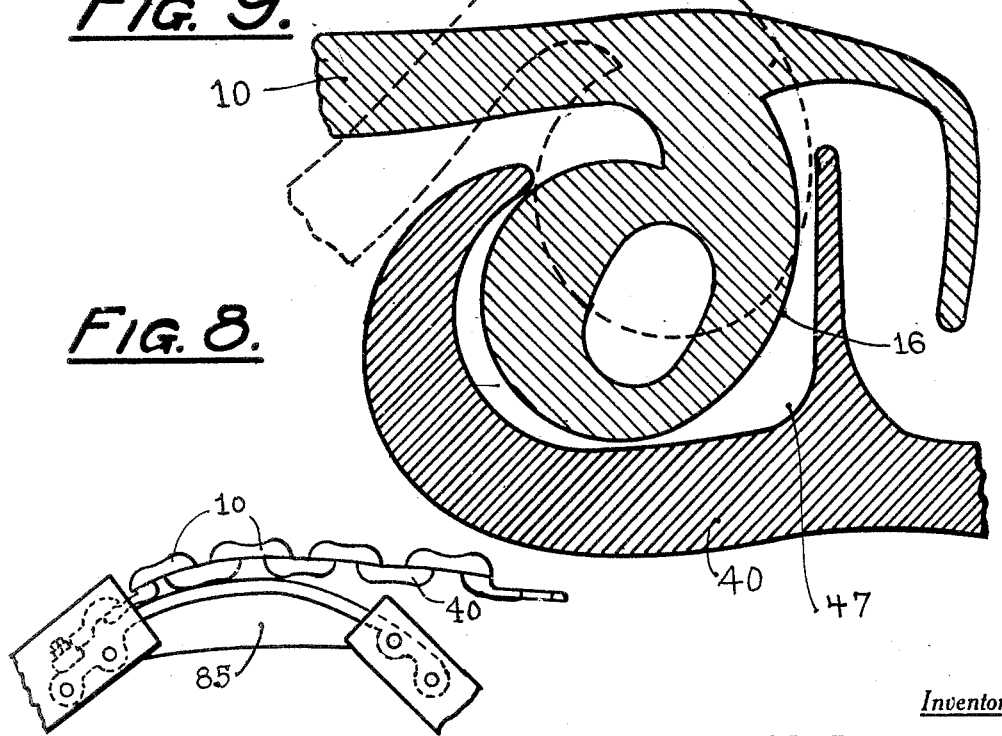
Inventor
BERT G. GOBLE.
By
Tom G. Boman. Attorney Patented Jan. 26, 1932

1,842,521

UNITED STATES PATENT OFFICE

BERT G. GOBLE, OF TULSA, OKLAHOMA, ASSIGNOR TO W. A. QUIGLEY

TWO PIECE CHAIN WITH OIL BATH

Application filed May 28, 1929. Serial No. 366,727.

This invention relates to a flexible power transmitting means and more particularly to a chain.

Chains previously constructed have not been suitable for an oscillating horizontal movement or slow speed. Neither has there been any chains designed so that the large wearing surface and desired strength may be obtained at a reasonable price.

Chains previously constructed have been composed of several parts and several fastening devices to hold these parts in working relationship and consequently they are not only expensive to construct but also it is very hard to replace parts or make any repairs on the ordinary type of chains.

Another objection to chains as previously constructed is that it is hard to keep them lubricated. Moreover, it is hard to clean them when they get gummy with oil and dirt.

Most all bearings that run in a bath of oil and especially those used in the oil country, have an opening and when it rains the water replaces the oil and the bearing runs in a bath of water.

Another objection to all chains as now constructed is that the lubricated parts are not protected from rain snow, dust, etc.

Now, in my new type of chain I do away with the many objections just recited and I also obtain other advantages which will be set forth as the description proceeds.

In the first place I make my chain exceedingly simple by forming it of only two parts. These two parts are so designed as to lock together when in operating or working position and yet easily taken apart when desired. Moreover, I eliminate any fastening devices such as bolts or cotter keys.

Another advantage inherent to my chain is the fact that it may be operated against either a concave surface or else an inverted concave surface. This is made possible by forming both the top and bottom members with contacting portions and hence the same chain may be used on either an overpull jack or an underpull jack and yet still retain its bath of oil.

Another advantage is my provision for lubricating the chain. By eliminating a pivot of the like for the journal I make it possible to form a reservoir which fully covers all wearing parts of the chain while in operation.

The amount of oil carried by the bottom member is enough to properly lubricate the chain for a long period of time. This is accomplished by hollowing out or coring the journal member and by forming an extra oil recess adjacent the journal. Since the journal is hollow it divides the reservoir into several compartments and thus eliminates surging or splashing of the oil back and forth.

It will be noted that my construction leaves a small space between the journal and the seat on the same side of the journal as the extra oil recess. However, oil is kept from overflowing on this side of the recess by making its wall slightly higher on this side. The other side of the journal makes a snug fit and hence no oil will be lost by splashing out due to the chain tilting slightly from the horizontal in its operation.

Still another advantage is the roof which I provide to shield the oil reservoir from the rain, dust and the like. This roof extends down over the juncture between the top and bottom members and an oil hole extends through the same in order that oil may be introduced to replenish the supply as desired.

Another advantage of my chain is that it is held together in general handling, shipping and in operation without the use of bolts, rivets, cotter pins, or the like, but is put together by simply turning the two parts in one particular position to each other at which position they slip together very easily. This is a big advantage as in chains previously used it takes an hour or so to replace one link when worn out whereas in my chain it can be done in a minute.

Another advantage of my invention is to make a big, strong chain with a lot of wearing surface that can be constructed out of rough castings without any machine work or welding or any other operation whatsoever.

Still another object of my invention is to provide a chain on which there can be no side friction except on a surface flooded with oil.

Other objects reside in the special construction, combination, and arrangement of the various elements forming the invention as more fully hereinafter described and claimed, reference being had to the accompanying drawings forming part hereof, wherein;

Fig. 7 is a perspective view of the end unit of my chain.

Fig. 8 is a diagrammatic sketch illustrating how my chain is taken apart or put together.

Fig. 9 is a view of my chain in use with an underpull rocker.

Fig. 10 is a view of my chain in use with an overpull rocker.

Figure 1:
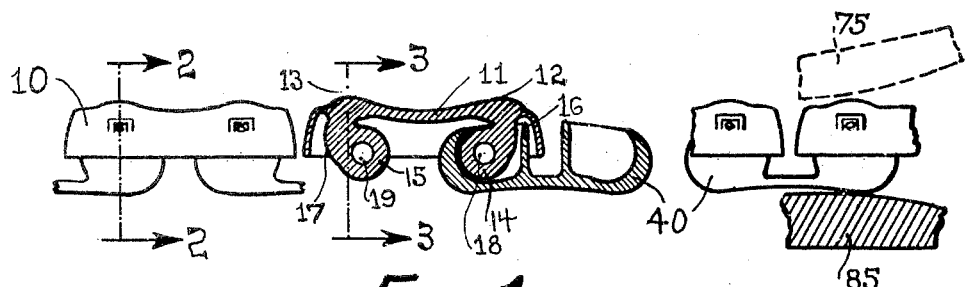
Fig. 1 is a side view of my two piece chain with certain parts broken away in order to clarify the showing.
Figures 2, 3, 4:
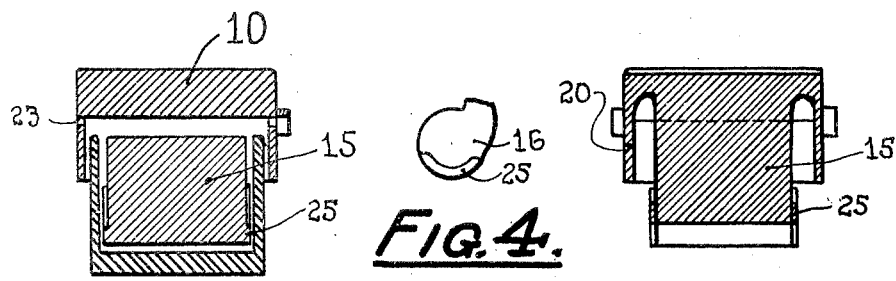
Fig. 2 is a view taken along the line 2—2 of Fig. 1.
Fig. 3 is a view taken along the line 3—3 of Fig. 1.
Fig. 4 is an end view of a typical journal member.

Referring now to the drawings, —10— designates the top member of my chain and —40— indicates the bottom link or member. A link or member —50— is used to fasten one end of the chain to a pulling element. (Not shown). A member —30— is used to fasten the other end of the chain to a rocker such as —75—, see Fig. 9, or —85—, see Fig. 10.

The top member —10— is formed of a rectangular body —11— which is curved so as to have two humps or bosses —12— and —13— which may bear against an inverted concave support such as indicated by the dotted construction of Fig. 1.

Figure 5:
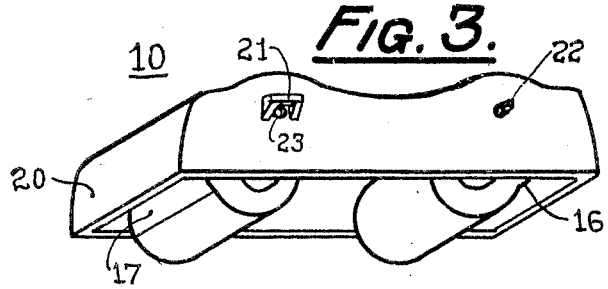
Fig. 5 is a perspective view of the top member of my chain.
Figure 6:
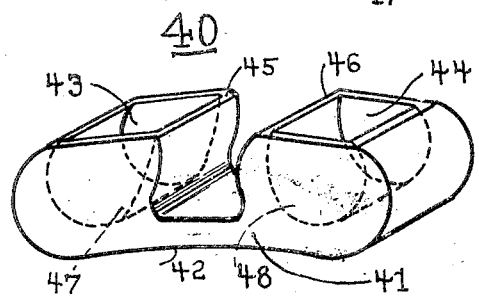
Fig. 6 is a perspective view of the bottom member of my chain.

Journals —14— and —15— are formed directly below the bosses but on the opposite side of the body —11—. These journals have thickened portions —16— and —17— thereon as clearly shown in Figs. 1, 5 and 8. These journals are also cored as shown at —18— and —19—. An overhanging roof —20— has oil holes therethrough as shown in Fig. 5.

The oil holes may be threaded as shown at —23— and a plug —22— screwed therein or else an overhanging lip —21— may prevent the entrance of foreign matter.

A semi-circular shaped boss —25— is formed on the end of each journal and serves as a thrust bearing for the journal. The surface of this boss —25— is always below the level of the oil and hence no squeaking can occur.

The bottom member —40— is formed of a rectangular element —41— slightly curved as at —42— in order that the chain may properly bear upon its working support or surface —75— or —85—. Recesses or chambers —43— and —44— are formed with their inner walls —45— and —46— slightly higher than the remainder of the walls. Both of these chambers have their inner walls hollowed or recessed as shown at —47— and —48— and thus oil reservoir space is provided.

Referring to Fig. 7, —50— designates generally the end link. The recess —53— is similar to the recess —43— in the bottom member —40— and instead of another recess the other end —52— is flattened. A hole —54— therein provides fastening means.

Fig. 8 shows a schematic view of top member —10— in working position relative to the bottom member —40—. It will be noted that the thickened portion —16— prevents any accidental separation of the members. However, when desired, the top member may be shifted to the position shown in dotted lines and designated —100— and shifted upwardly in the direction of the arrow, A, thus separating the two members.

The terms and expressions which I have employed are used as terms of description and not of limitation, and I have no intention, in the use of such terms, and expressions, of excluding any mechanical equivalents of the features shown and described, or portions thereof, but recognize that various structural modifications are possible within the scope of the invention claimed.

What I claim is:

1. A chain formed by placing together a series of units, each unit consisting of an integral bottom member having upwardly extending chambers or recesses formed at its ends; said chambers or recesses having a constricted top opening therein; a top member having downwardly extending journal members formed to revolubly fit in the chambers or recesses and said journals having a thickened portion just below the constricted top opening when the unit is in working position; said top member having a roof extending around and down from its upper edge and also having means to lubricate the journal passing therethrough.

2. A chain formed by placing together a series of units, each unit consisting of a bottom member having upwardly extending chambers or recesses formed at its ends; said chambers or recesses having a constricted top opening; a top member having downwardly extending journal members formed to revolubly fit in the chambers or recesses and said journals having a thickened portion just below the restricted or constricted top opening when the unit is in operating condition or position.

3. A chain comprised of a series of units, each unit consisting of a bottom member having upwardly extending recesses at each end; a top member having downwardly extending journals to fit the recesses as desired; said top member having a roof extending over the periphery of the recess into which the journal fits.

4. A chain comprised of a series of units, each unit consisting of a top member having journals integral therewith and depending therefrom and a bottom member having a recess in each end and facing upwardly whereby a lubricant chamber is provided; the journals being placed in the recesses as the several units are assembled.

5. A chain unit comprised of a member having a recess with a constricted top opening; another member having a journal riding in said recess; said journal having a thickened portion adjacent the constricted top opening when in its working position whereby the members are locked together.

6. A chain unit comprised of a top member having journals thereon, bosses integrally formed on the lower portion of either end of each journal, and a bottom member having a recess into which one of said journals may be placed whereby lubricant may be contained in the recess to a level above the said bosses.

In testimony whereof I affix my signature.

BERT G. GOBLE.